(12) United States Patent
Rooney

(10) Patent No.: US 11,161,287 B2
(45) Date of Patent: **\*Nov. 2, 2021**

(54) ORAL CARE IMPLEMENT OR HEAD PLATE THEREFOR AND METHOD OF FORMING THE SAME

(71) Applicant: Colgate-Palmolive Company, New York, NY (US)

(72) Inventor: Michael Rooney, Millburn, NJ (US)

(73) Assignee: Colgate-Palmolive Company, New York, NY (US)

( \* ) Notice: Subject to any disclaimer, the term of this patent is extended or adjusted under 35 U.S.C. 154(b) by 231 days.

This patent is subject to a terminal disclaimer.

(21) Appl. No.: 16/658,317

(22) Filed: Oct. 21, 2019

(65) Prior Publication Data

US 2020/0047381 A1 Feb. 13, 2020

Related U.S. Application Data

(63) Continuation of application No. 15/710,968, filed on Sep. 21, 2017, now Pat. No. 10,500,773.

(Continued)

(51) Int. Cl.
*B29C 45/00* (2006.01)
*A46B 9/04* (2006.01)
(Continued)

(52) U.S. Cl.
CPC .......... *B29C 45/0053* (2013.01); *A46B 1/00* (2013.01); *A46B 3/005* (2013.01); *A46B 9/005* (2013.01);
(Continued)

(58) Field of Classification Search
CPC ..... A46B 9/04; A46B 2200/1066; A46B 1/00; A46B 3/005; A46B 9/005;
(Continued)

(56) References Cited

U.S. PATENT DOCUMENTS 6,361,733 B1 3/2002 Eicher et al.
7,226,555 B2 6/2007 Weihrauch
(Continued)

FOREIGN PATENT DOCUMENTS

CN 1652915 8/2005
CN 104066517 9/2014
(Continued)

OTHER PUBLICATIONS

International Search Report and Written Opinion of the International Searching Authority in International Application No. PCT/US2017/052621, dated Jan. 10, 2018.

*Primary Examiner* — Weilun Lo

(57) ABSTRACT

A method of forming an oral care implement, a method of forming a head plate for an oral care implement, and an oral care implement or head plate formed therefrom. The head plate may have micro-sized or fine features. The method may include providing an amount of a first solid material upstream of a first mold cavity; prior to the first solid material entering the first mold cavity, applying ultrasonic energy to the first solid material to melt the first solid material into a first molten material; flowing the first molten material into the first mold cavity; allowing the first molten material to harden within the first mold cavity to form a head plate comprising micro-sized features; forming a body from a second material, the body including a handle portion and a head portion; and coupling the head plate to the head portion of the body.

14 Claims, 13 Drawing Sheets

Related U.S. Application Data

(60) Provisional application No. 62/399,794, filed on Sep. 26, 2016.

(51) Int. Cl.

| | | |
|---|---|---|
| *A46B 9/00* | (2006.01) | |
| *A46B 3/00* | (2006.01) | |
| *A46D 3/00* | (2006.01) | |
| *B29C 65/08* | (2006.01) | |
| *A46B 1/00* | (2006.01) | |
| *B29B 13/08* | (2006.01) | |
| *B29B 13/02* | (2006.01) | |
| *B29C 39/42* | (2006.01) | |
| *A46D 1/00* | (2006.01) | |
| *B29C 35/02* | (2006.01) | |
| *B29L 31/42* | (2006.01) | |

(52) U.S. Cl.
CPC .............. *A46B 9/04* (2013.01); *A46D 1/0261* (2013.01); *A46D 3/00* (2013.01); *B29B 13/022* (2013.01); *B29B 13/08* (2013.01); *B29C 39/42* (2013.01); *B29C 65/08* (2013.01); *A46B 2200/1066* (2013.01); *B29C 35/0261* (2013.01); *B29C 45/006* (2013.01); *B29C 2791/008* (2013.01); *B29L 2031/425* (2013.01)

(58) Field of Classification Search
CPC . B29L 2031/425; B29B 13/08; B29B 13/022; B29C 39/42; B29C 65/08; B29C 35/0261; B29C 2791/008; B29C 45/0053; A46D 1/0261; A46D 3/00
See application file for complete search history.

(56) References Cited

U.S. PATENT DOCUMENTS

| | | | |
|---|---|---|---|
| 8,182,255 | B2 | 5/2012 | Torralba et al. |
| 8,567,644 | B2 | 10/2013 | Luis |
| 8,734,144 | B2 | 5/2014 | Torralba et al. |
| 8,758,000 | B2 | 6/2014 | Puliga et al. |
| 9,066,579 | B2 | 6/2015 | Hess et al. |
| 9,089,202 | B2 | 7/2015 | Vankov et al. |
| 9,420,877 | B2 | 8/2016 | Wen et al. |
| 9,717,324 | B2 | 8/2017 | Bresselschmidt et al. |
| 9,750,334 | B2 | 9/2017 | Roger et al. |
| 9,826,822 | B2 | 11/2017 | Geiberger et al. |
| 9,980,557 | B2 | 5/2018 | Hohlbein |
| 10,136,723 | B2 | 11/2018 | Moskovich |
| 10,278,485 | B2 | 5/2019 | Hohlbein et al. |
| 2006/0165832 | A1 | 7/2006 | Mian et al. |
| 2008/0224529 | A1* | 9/2008 | Kwon ...................... A46B 3/06 300/21 |
| 2011/0061189 | A1 | 3/2011 | Meadows et al. |
| 2014/0137354 | A1 | 5/2014 | Newman et al. |
| 2014/0138880 | A1* | 5/2014 | Pfeifer ..................... A46B 5/02 264/532 |
| 2014/0173853 | A1 | 6/2014 | Kirchhofer et al. |
| 2015/0174802 | A1 | 6/2015 | Newman et al. |
| 2018/0317644 | A1* | 11/2018 | Xi ........................ A46D 1/0207 |
| 2018/0360202 | A1* | 12/2018 | Xi .......................... A46B 3/005 |
| 2018/0360204 | A1 | 12/2018 | Xi et al. |

FOREIGN PATENT DOCUMENTS

| | | |
|---|---|---|
| CN | 104902785 | 9/2015 |
| DE | 102008037103 | 2/2010 |
| DE | 102008037103 | 3/2012 |
| EP | 2471644 | 7/2012 |
| GN | 104902785 | 9/2015 |
| WO | 1994/013461 | 6/1994 |
| WO | 2002/003831 | 1/2002 |
| WO | 2016/103016 | 6/2016 |

* cited by examiner

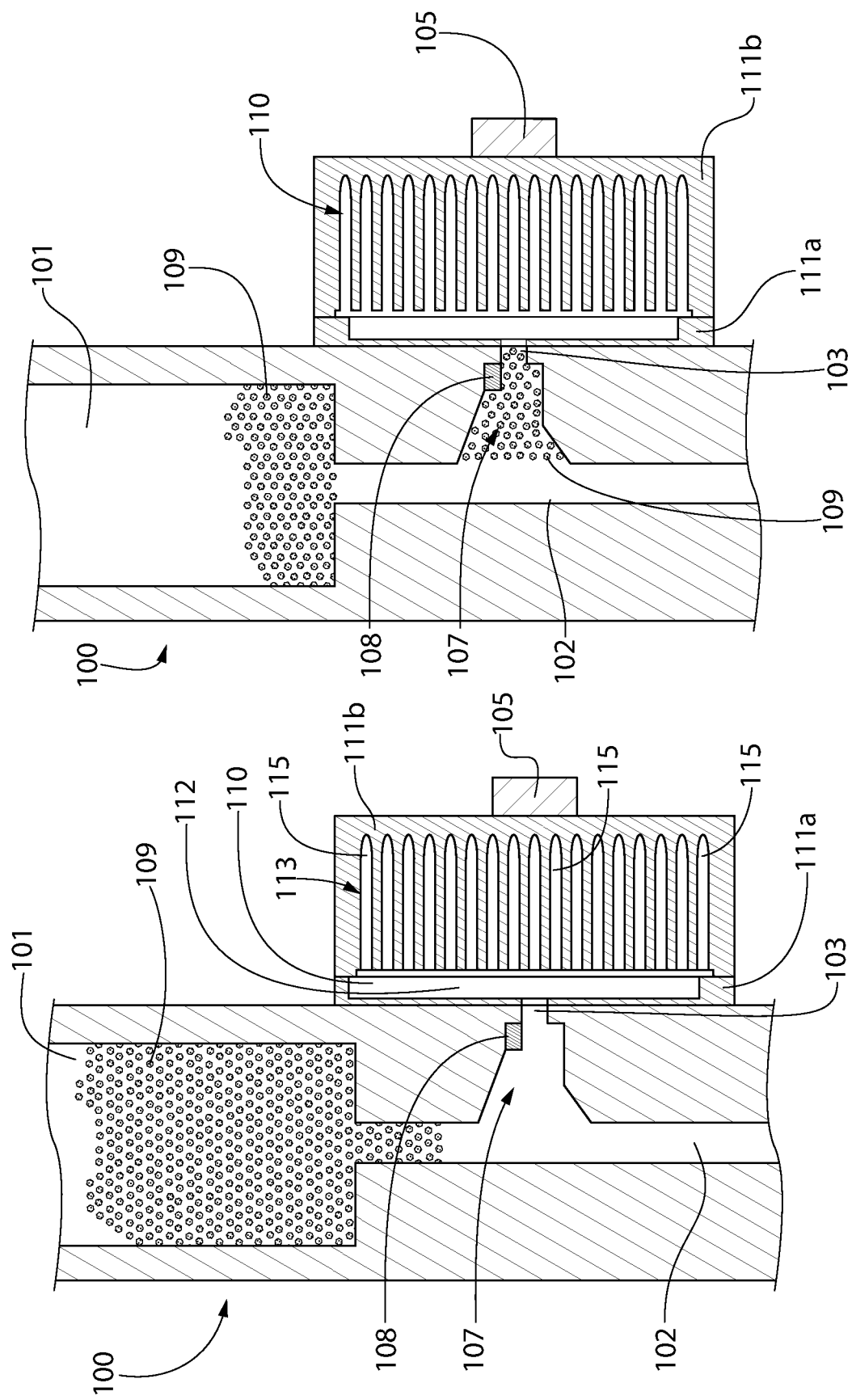

ORAL CARE IMPLEMENT OR HEAD PLATE THEREFOR AND METHOD OF FORMING THE SAME

CROSS-REFERENCE TO RELATED APPLICATIONS

The present application is a continuation of U.S. patent application Ser. No. 15/710,968, filed Sep. 21, 2017, which claims the benefit of U.S. Provisional Patent Application Ser. No. 62/399,794, filed Sep. 26, 2016, the entireties of which are incorporated herein by reference.

BACKGROUND

Oral care implements such as toothbrushes and parts thereof are often manufactured using injection molding techniques. However, injection molding is best suited for forming larger parts. There is a desire in the oral care implement industry to form devices with miniaturized parts that are better suited and tailored for specific surface cleaning. For example, to clean the interproximal surfaces or the surfaces between the teeth and the gums, smaller cleaning elements are needed. Furthermore, forming cleaning elements with micro-sized or very fine surface features can provide textures on the cleaning elements for enhanced cleaning. However, forming such micro-sized and fine features is difficult to do in a replicable manner using traditional injection molding techniques. Thus, a need exists for a technique for manufacturing oral care implements such as toothbrushes that overcomes the above deficiencies.

BRIEF SUMMARY

The present invention may be directed to a method of forming an oral care implement comprising a body and a head plate. The body may be formed using traditional ultrasonic molding techniques. The head plate may be formed using ultrasonic molding. The head plate may be integrally formed with cleaning elements. The head plate and the body may be separately formed and later coupled together using ultrasonic welding, over molding, multi-shot injection molding, or the like.

In one aspect, the invention may be a method of forming an oral care implement comprising: providing an amount of a first solid material within a holding cavity located upstream of a first mold cavity; prior to the first solid material entering the first mold cavity, applying ultrasonic energy to the first solid material within the holding cavity to melt the first solid material into a first molten material; flowing the first molten material into the first mold cavity; allowing the first molten material to harden within the first mold cavity to form a head plate comprising micro-sized features; forming a body from a second material, the body including a handle portion and a head portion; and coupling the head plate to the head portion of the body.

In another aspect, the invention may be a method of forming a monolithic head plate for an oral care implement, the head plate comprising a base portion and a plurality of cleaning elements extending from the base portion, the plurality of cleaning elements comprising a body portion and a plurality of micro-sized protuberances extending from the body portion, the method comprising: providing a first mold having a first mold cavity, the first mold cavity comprising a first channel section corresponding to the base portion of the head plate, a second channel section corresponding to the body portions of the plurality of cleaning elements, the second channel section comprising a plurality of elongated channels extending from the first channel section, and a plurality of micro-sized channels corresponding to the plurality of micro-sized protuberances of the plurality of cleaning elements, each of the micro-sized channels extending from one of the elongated channels of the second channel section; providing a first solid material upstream of the first mold cavity; applying ultrasonic energy to the first solid material to melt the first solid material into a first molten material; flowing the first molten material into the first mold cavity until an entire volume of each of the first and second channel sections and the micro-sized channels of the first mold cavity are filled with the first molten material; and allowing the first molten material to harden within the first mold cavity to form the head plate.

In yet another aspect, the invention may be an integrally molded head plate for an oral care implement comprising: a base portion comprising a first surface and a second surface opposite the first surface; a plurality of cleaning elements extending from the first surface, each of the cleaning elements comprising a body portion that extends along a longitudinal axis from the first surface of the base portion to a distal end of the cleaning element, the body portion of the cleaning elements having an outer surface; a plurality of protuberances extending from the outer surface of the of the body portion of each of the cleaning elements to a distal end; wherein a height of each of the plurality of protuberances measured from the outer surface of the body portion to the distal end of the protuberance is between 0.004 and 0.020 inches; and wherein a ratio of the length of the body portion of the cleaning elements to the height of the protuberances is in a range of 17.5 to 117.5.

In a further aspect, the invention may be a method of forming an oral care implement comprising: providing an amount of a first solid material upstream of a first mold cavity; prior to the first solid material entering the first mold cavity, applying ultrasonic energy to the first solid material to melt the first solid material into a first molten material; flowing the first molten material into the first mold cavity; allowing the first molten material to harden within the first mold cavity to form a head plate; forming a body from a second material, the body including a handle portion and a head portion; and coupling the head plate to the head portion of the body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2A is a close-up view of area IIA of FIG. 1 illustrating a source of a solid material, an intermediate holding cavity, and a mold cavity.

FIG. 2B is the close-up view of area IIA of FIG. 1 illustrating the solid material in the holding cavity.

DETAILED DESCRIPTION

Figure 1:
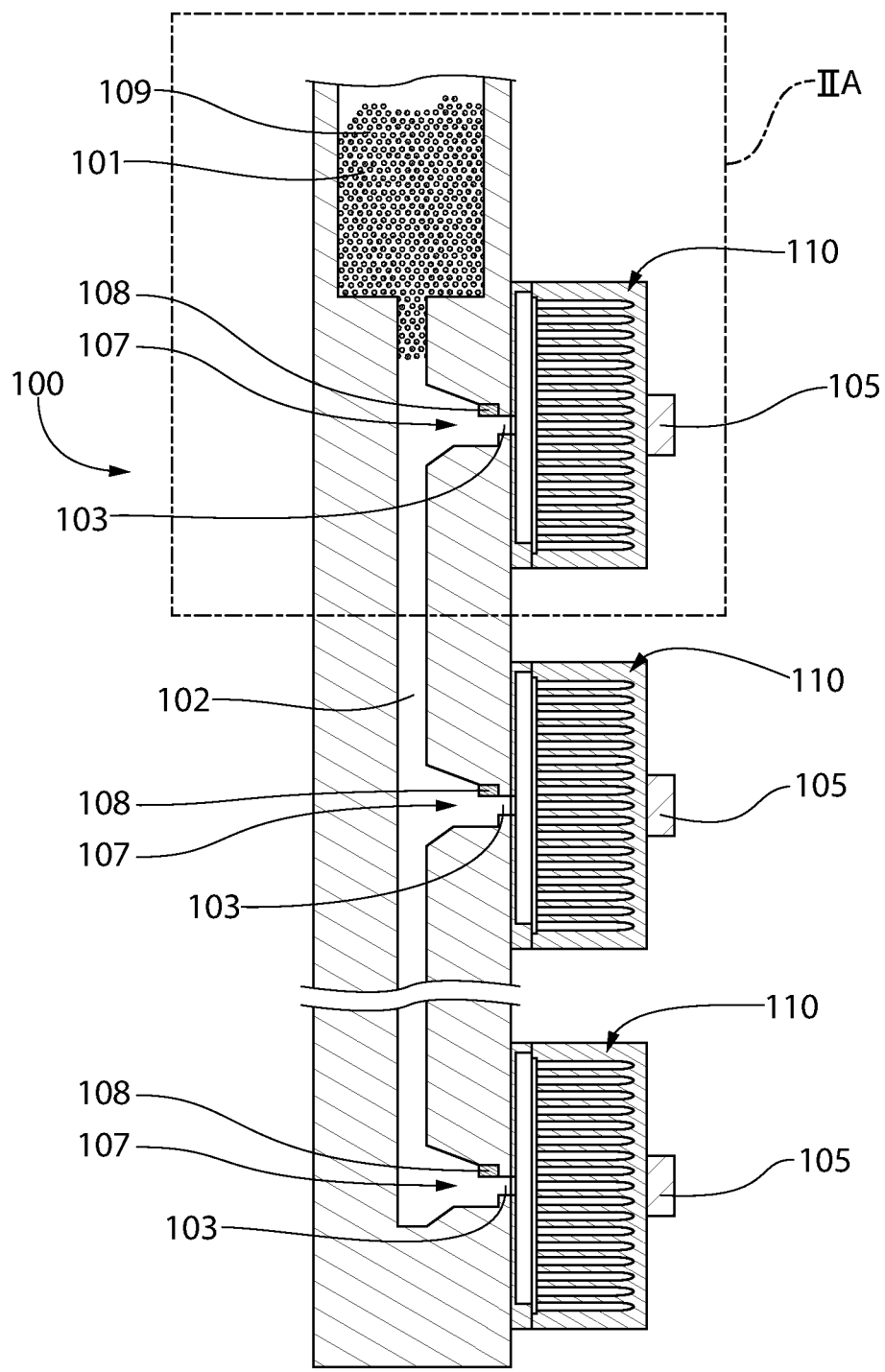
FIG. 1 is a schematic view of an injection molding system in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Oral care implements, such as toothbrushes and the like, are frequently formed using injection molding processes. For example, some toothbrushes are formed, with the bristles excepted, in a single shot injection molding process out of a rigid plastic material such as polypropylene. Such toothbrushes may be overmolded with a thermoplastic elastomer material in a second shot to form a comfortable grip, a soft tissue cleaner, or other features on the toothbrush. The bristles may be coupled to the head after the toothbrush body is formed using a tufting machine and a staple. Newer technologies have created toothbrushes using an anchor free tufting ("AFT") process that avoids the requirement for staples. In one such AFT process, the toothbrush body is formed in a first mold cavity and a head plate is formed in a second mold cavity. Bristles are then inserted into holes in the head plate and coupled to the head plate by melting ends of the bristles together into a melt matte that lies against the rear surface of the head plate. The head plate is then inserted into a basin/cavity in the head portion of the body and coupled thereto using ultrasonic welding or the like. The melt matte in such embodiments is trapped within the basin/cavity which prevents the bristles from being separated from the toothbrush.

Newer technologies permit plastic components to be formed using ultrasonic molding whereby ultrasonic energy is used to melt the plastic pellets that are used in the injection molding process. Ultrasonic molding has been successfully used for manufacturing micro parts (i.e., micro molding), or parts that have a very small size, a small cross-sectional area, a large aspect ratio, or the like. Features that are of this very small size may be referred to herein as micro features or micro-sized features. As used herein, micro features or micro-sized features may be features that have maximum cross-sectional areas in a range of 0.001 to 0.012 inches$^2$ and/or heights protruding from a base surface in a range of 0.004 to 0.020 inches. In some instances, a micro feature may be a feature that has a large aspect ratio, meaning it has a height that is significantly larger than its cross-sectional area when the cross-section is taken transverse to an axis extending along its height. Thus, in some embodiments the micro-sized features may have one of a cross-sectional area in a range of 0.001 to 0.012 inches$^2$ and a height in a range of 0.004 to 0.020 inches, but not both. In other embodiments, the micro-sized features may have both cross-sectional areas and heights that fall within the above-noted ranges. In some embodiments, a micro-sized feature is one that has a volume of between 0.000008 and 0.003 cubic inches, or a volume of less than 0.005 cubic inches.

The ability to form micro-sized features or parts can be useful to form cleaning elements, such as those used for cleaning a user's teeth, gums, interproximal areas, and the like, or protuberances thereon that have very small and fine features to allow for a better and more effective cleaning. Although certain ranges are provided herein for the term micro-sized features, the invention is not to be limited to those ranges in all embodiments and some micro-sized features may be larger than the dimensions provided herein. However, in such embodiments the term micro-sized features may refer to any feature that is formed by micro molding as would be understood by persons skilled in the art.

Referring to FIG. 1, a schematic is provided illustrating a system 100 for injection molding head plates that are used for oral care implements such as toothbrushes. Although the invention is described herein with regard to the manufacture of a toothbrush, the techniques described herein are not be limited solely to toothbrushes but may include a manual toothbrush, a powered toothbrush, a tongue scraper, a gum and soft tissue cleanser, a water pick, an interdental device, a tooth polisher, a specially designed ansate implement having cleaning elements, or any other type of implement that is commonly used for oral care. Furthermore, although a head plate is the component being formed using ultrasonic molding technology in the exemplary embodiment of the present invention, the invention is not to be so limited and other parts of a toothbrush or oral care implement may be formed using ultrasonic injection molding. For example, the system 100 may be used to form a head portion of the toothbrush, or the system 100 may be used to form the entire toothbrush. Thus, there are variations that fall within the scope of the invention described herein.

The system 100 includes a hopper 101, a main conduit 102 extending from the hopper 101 to one or more sub-conduits 103, and a plurality of first mold cavities 110, each of which is fluidly coupled to one of the sub-conduits 103. In the exemplified embodiment, a first solid material 109 is stored in the hopper 101. The first solid material 109 is illustrated as a plurality of round pellets, but the first solid material 109 may be in other shapes, sizes, or the like as desired. The first solid material 109 may be a plastic material that is in pellet form that can be melted and then moved into a mold cavity in flowable form to take the shape of the mold cavity. The first solid material 109 may be used to form a head plate for an oral care implement having micro-sized features as described further herein below.

The system 100 also includes a holding cavity 107 and a first ultrasonic transducer 108 located between the main conduit 102 and each of the mold cavities 110. During use of the system 100 to form head plates as described in more detail herein below, the first solid material 109 is passed through the main conduit 102 and into the holding cavities 107 where the first solid material is melted to form a first molten material. The first molten material is then passed through the sub-conduits 103 into each of the first mold cavities 110 where it takes the shape of the first mold cavities 110.

In the exemplified embodiment, the first ultrasonic transducer 108 is located within the holding cavity 107. However, the exact location of the first ultrasonic transducer 108 may be different than that shown in the exemplified embodiments so long as it is placed in a location that permits it to melt the first solid material 109 to form a first molten material 119 as described herein below. For example, the first ultrasonic transducer 108 may be located at the hopper 101 to apply ultrasonic energy to the first solid material 109 within the hopper 101, at or along the main conduit 102 or the sub conduits 103 to apply the ultrasonic energy to the first solid material 109 as it flows along the main or sub conduits 102, 103, or the like. The first ultrasonic transducer 108 may be a movable component. In such an embodiment, as the holding cavity 107 is filled with the first solid material 109 the first ultrasonic transducer 108 may be moved along the outer or inner surface of the holding cavity 107 and into contact with the first solid material 109 to melt the first solid material 109 as described herein. In some embodiments, the first ultrasonic transducer 108 may be a movable probe that melts the first solid material 109 and simultaneously forces the molten material into the first mold cavity 100. Several variations of the location and movability of the first ultrasonic transducer 108 are possible within the scope of this invention.

The first ultrasonic transducer 108 is a device that generates ultrasonic energy/waves for application to the first solid material 109 to facilitate melting thereof to form a first molten material 119. The melting is achieved by the ultrasonic waves causing the pellets to vibrate and liquefy almost instantaneously. This is different and more efficient than melting using heat as with conventional injection molding techniques. Thus, in some embodiments the system 100 uses ultrasonic energy rather than heat as is used in standard injection molding processes to melt the material to enable it to flow into and fully fill the mold cavities 110. Melting a material using ultrasonic energy uses less energy and is therefore cheaper than using heat and also results in less material waste. Specifically, the amount of the first solid material 109 that is melted may be the exact amount that is required to completely fill the mold cavity 110 such that there is no excess of the melted material that has to be discarded. Furthermore, plastic that is melted using ultrasonic energy has better flow characteristics due to a lower viscosity which better enables the melted material to flow into very tight/small spaces of a mold cavity. As a result, using ultrasonic energy to melt the material is better for the formation of components having micro-sized parts.

In certain embodiments, the first ultrasonic transducer 108 may comprise one or more piezoelectric components and a transmitter. The piezoelectric components are configured to generate ultrasonic energy as described herein. The transmitter may be operably coupled to the piezoelectric components and configured to transmit the ultrasonic energy to the first solid material 109. The transmitter may transmit the ultrasonic energy to the first solid material 109 via direct contact between the transmitter and the first solid material 109 or indirectly depending on the exact structure and configuration of the various components of the system 100. The first ultrasonic transducer 108 may take on any desired shape and structure so long as it is configured to generate ultrasonic energy to melt the first solid material 109 as described herein. The first ultrasonic transducer 108 may be formed of titanium, aluminum, steel, or the like in some embodiments, although the invention is not to be so limited in all embodiments.

In the exemplified embodiment, a second ultrasonic transducer 105 is coupled to each of the first mold cavities 110. The second ultrasonic transducer 105 is another device that generates ultrasonic energy/waves. The frequency of the ultrasonic energy generated by the second ultrasonic transducer 105 may be the same as or different than the frequency of the ultrasonic energy generated by the first ultrasonic transducer 108. In certain embodiments by the time the second ultrasonic transducer 105 generates ultrasonic energy, the material in the system 100 has already been melted to form the first molten material 119 due to the ultrasonic waves produced by the first ultrasonic transducer 108. However, the second ultrasonic transducer 105 is coupled to the first mold cavities 110 to assist and facilitate in the flow of the first molten material 119 into any small micro-sized channels that may be found within the first mold cavities 110. Thus, in case the first molten material 119 has a viscosity or thickness that prevents it from freely flowing into rather small channels of the first mold cavities 110 that are used to form micro-features of the cleaning elements, the ultrasonic waves generated by the second ultrasonic transducer 105 will create vibrations that may assist in moving the first molten material 119 into these channels of the first mold cavities 110 to provide a more consistent and reproducible product in the first mold cavities 110.

Although in the exemplified embodiment a separate and distinct second ultrasonic transducer 105 is coupled to each of the first mold cavities 110, in other embodiments a single second ultrasonic transducer 105 may extend across all of the first mold cavities 110. The second ultrasonic transducer 105 may also be positioned within the interior of the mold cavities 110 rather than on the exterior as illustrated in FIG. 1. Furthermore, in some embodiments the second ultrasonic transducer 105 may be altogether omitted.

Referring to FIGS. 2A-4A, a method of forming a head for an oral care implement or toothbrush using the system 100 will be described. FIG. 2A illustrates a portion of the system 100 of FIG. 1 including the hopper 101, the main conduit 102, one of the holding cavities 107, one of the sub conduits 103, and one of the first mold cavities 110. The first mold cavity 110 is formed by a first mold half 111a and a second mold half 111b that, when coupled together, form and define the first mold cavity 110 in a desired shape that corresponds to the shape of the product or component being formed in the first mold cavity 110. In this instance, the first mold cavity 110 has the shape of a head plate for a toothbrush whereby the head plate includes a base portion and cleaning elements extending therefrom. The cleaning elements may be, or may have extensions, textures, fins, or the like, that are in the micro-sized range as defined herein such that forming them without ultrasonic molding may prove difficult or may have undesirable and inconsistent replication. One or both of the first and second mold halves 111a, 111b may be movable to permit access into the mold cavity 110 so that the head plate can be removed therefrom once it is fully formed as described herein below.

As noted above and referring specifically to FIGS. 4 and 4A, the system 100 may be used to form a head plate 120 having a base portion 121 and a plurality of cleaning elements 122 extending from the base portion 121. The base portion 121 and the cleaning elements 122 are integrally formed so that the head plate 120 is a monolithic structure that includes the cleaning elements 122. Thus, the base portion 121 and the cleaning elements 122 are integrally formed in the same mold cavity 110. The head plate 120 may be formed of an elastomeric material as described herein below.

Figure 4:
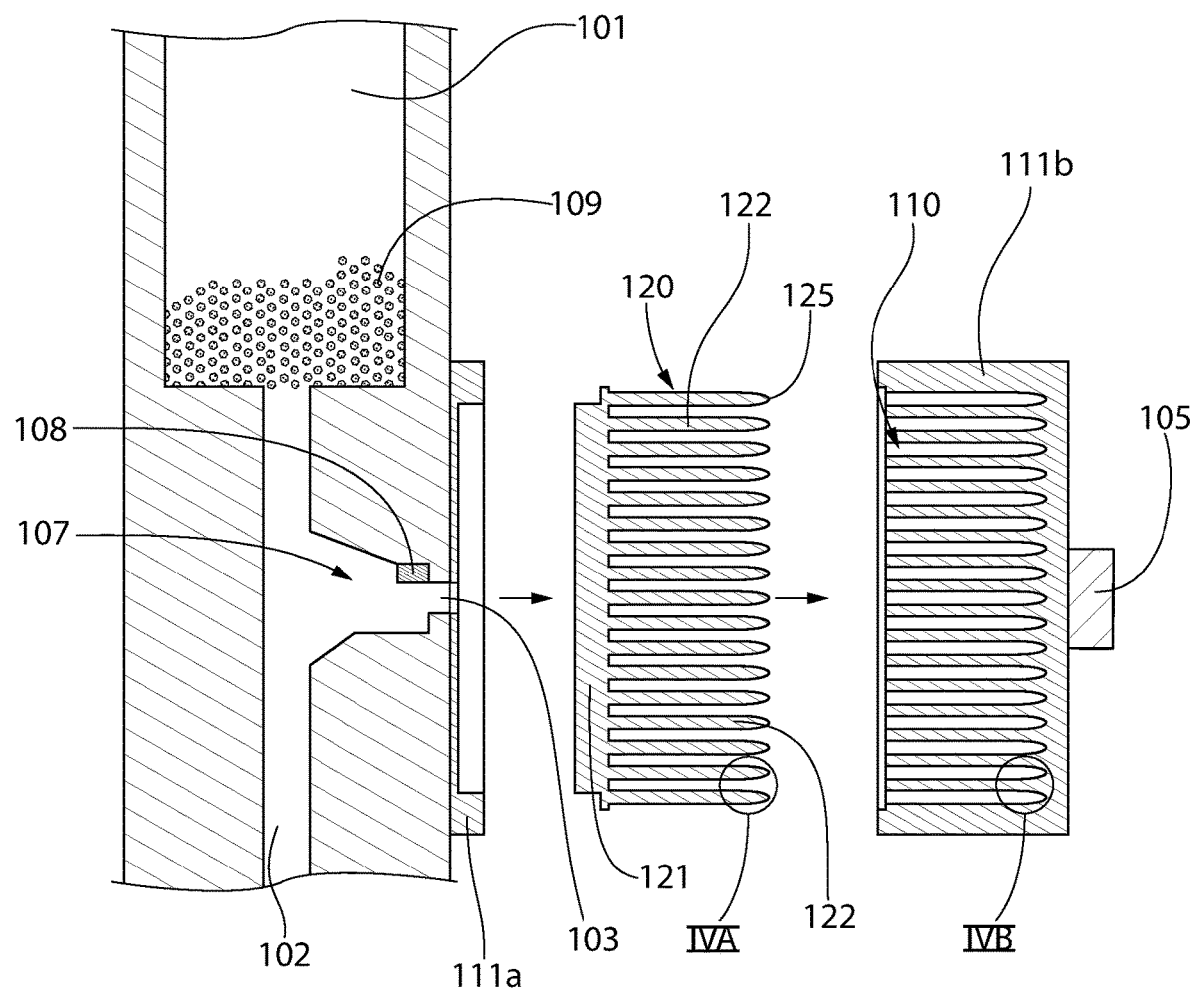
FIG. 4 illustrates a head plate being removed from the mold cavity.
Figure 4A:
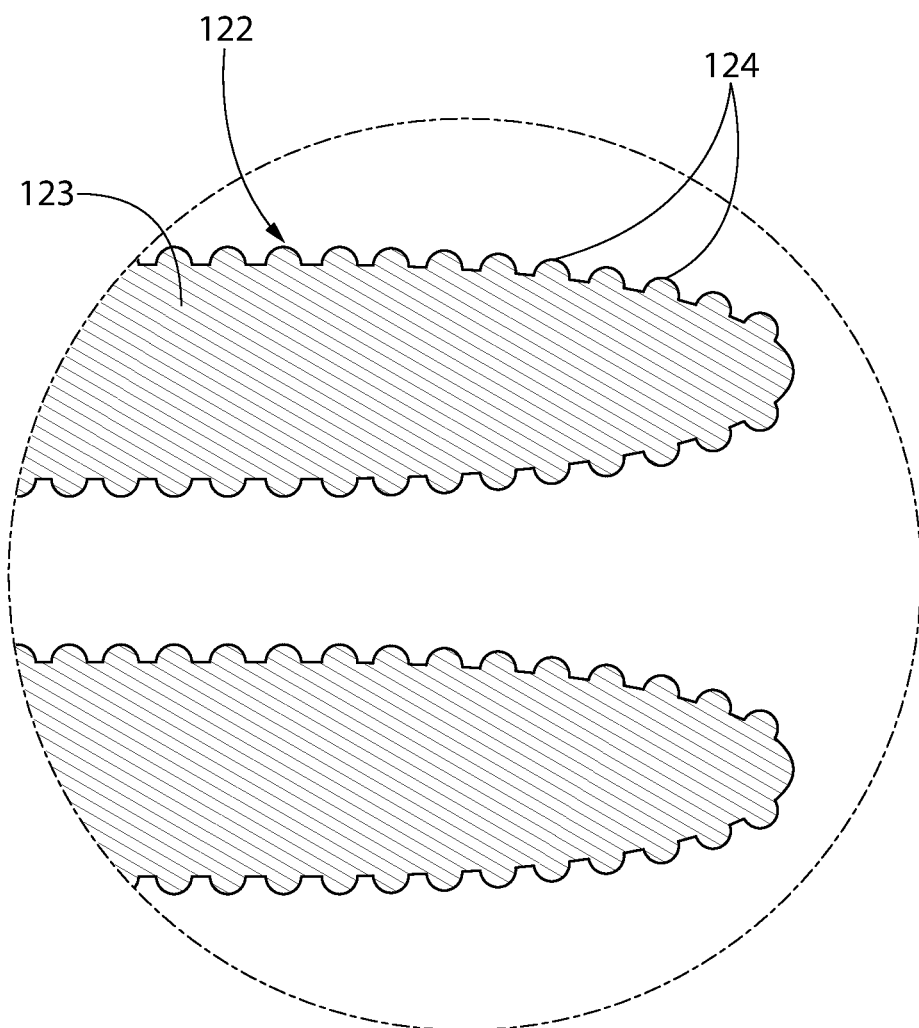
FIG. 4A is a close-up view of area IVA of FIG. 4.

As illustrated in FIG. 4A, in this embodiment the cleaning elements 122 comprise a body portion 123 and a plurality of protuberances 124 extending or protruding from the body portion 123. The body portions 123 extend from the base portion 121 to a distal end 125. The body portions 123 may have a length measured from a top surface of the base portion 121 from which the cleaning elements 122 extend to the distal ends 125 of between 0.35 and 0.47 inches (9 mm and 12 mm). The plurality of protuberances 124 may be micro-sized features protruding from the outer surface of the body portion 123 to aid in the oral cavity cleaning process. Specifically, the plurality of protuberances 124 may protrude from the outer surface of the body portion 123 to a height of between 0.004 and 0.020 inches (the height being measured from the outer surface of the body portion 123 to the distal ends of the protuberances 124). The protuberances 124 may all have the same length, or there may be variation in their lengths. A ratio of the length of the body portions 123 of the cleaning elements 122 to a height of the protuberances 124 may be in a range of 17.5 to 117.5, more specifically 30 to 100, and still more specifically 50 to 80. In some embodiments, the ratio of the length of the body portions 123 to the height of the protuberances 124 may be in a range of 17.5 to 87.5 or in a range of 23.5 to 117.5. The protuberances 124 may have a cross-sectional area in a range of 0.001 to 0.012 inches$^2$. Thus, the heights and cross-sectional areas of these protuberances 124, even at their largest, is less than 1 mm, and more specifically no greater than approximately 0.5 mm. In some embodiments, the protuberances 124 may have a volume of between 0.000008 and 0.0034 cubic inches (0.13 and 55 cubic mm), or a volume that is less than approximately 0.005 cubic inches (82 cubic mm).

In the exemplified embodiments, the protuberances 124 have the shape of small nubs with a rounded and smooth outer surface. However, the invention is not to be so limited and the protuberances 124 may take on any shape as desired. The protuberances 124 may be longer and thinner than that which is shown in some embodiments. The protuberances 124 may be conical rather than dome-shaped, the protuberances 124 may have a textured or otherwise non-smooth outer surface, the protuberances 124 may have square rather than rounded cross-sectional shapes, or the like. Thus, the details of the shape of the protuberances 124 are not limited to that which is illustrated in FIG. 4A and alternatives are possible within the scope of the invention described herein. The protuberances 124 are micro-sized features, but other details of the protuberances 124 may be changed within the scope of the present disclosure.

Such tiny protuberances 124 are quite difficult to create using standard injection molding techniques, but the use of ultrasonic injection molding permits these tiny protuberances 124 to be formed in a consistent manner. These protuberances 124, when formed, may protrude from the body portion 123 of the cleaning elements 122 at any of a variety of angles relative to a longitudinal axis of the body portion 123 of the cleaning elements 122. Thus, they may protrude at an angle that is perpendicular to the longitudinal axis of the body portion 123 of the cleaning elements 122 or an angle that is oblique (acute or obtuse) to the longitudinal axis of the body portion 123 of the cleaning elements 122. Furthermore, the number, spacing, and specific positioning of the protuberances 124 on the body portion 123 as illustrated in FIG. 4A should not be considered limiting of the present invention in all embodiments. The possibilities for the size, shape, protruding angle, location, spacing, number, and the like of the protuberances 124 that can be formed using ultrasonic injection molding are endless. Such micro-sized protuberances 124 extending from the body portion 123 of the cleaning elements 122 will enhance the effectiveness of brushing one's teeth and other oral cavity surfaces as the protuberances 124 will be able to penetrate into small gaps in the oral cavity to remove bacteria, plaque, tartar, and other debris therefrom. Furthermore, the protuberances 124 may form a textured outer surface of the cleaning elements 122 to more effectively clean the teeth and other oral surfaces.

Figure 4B:
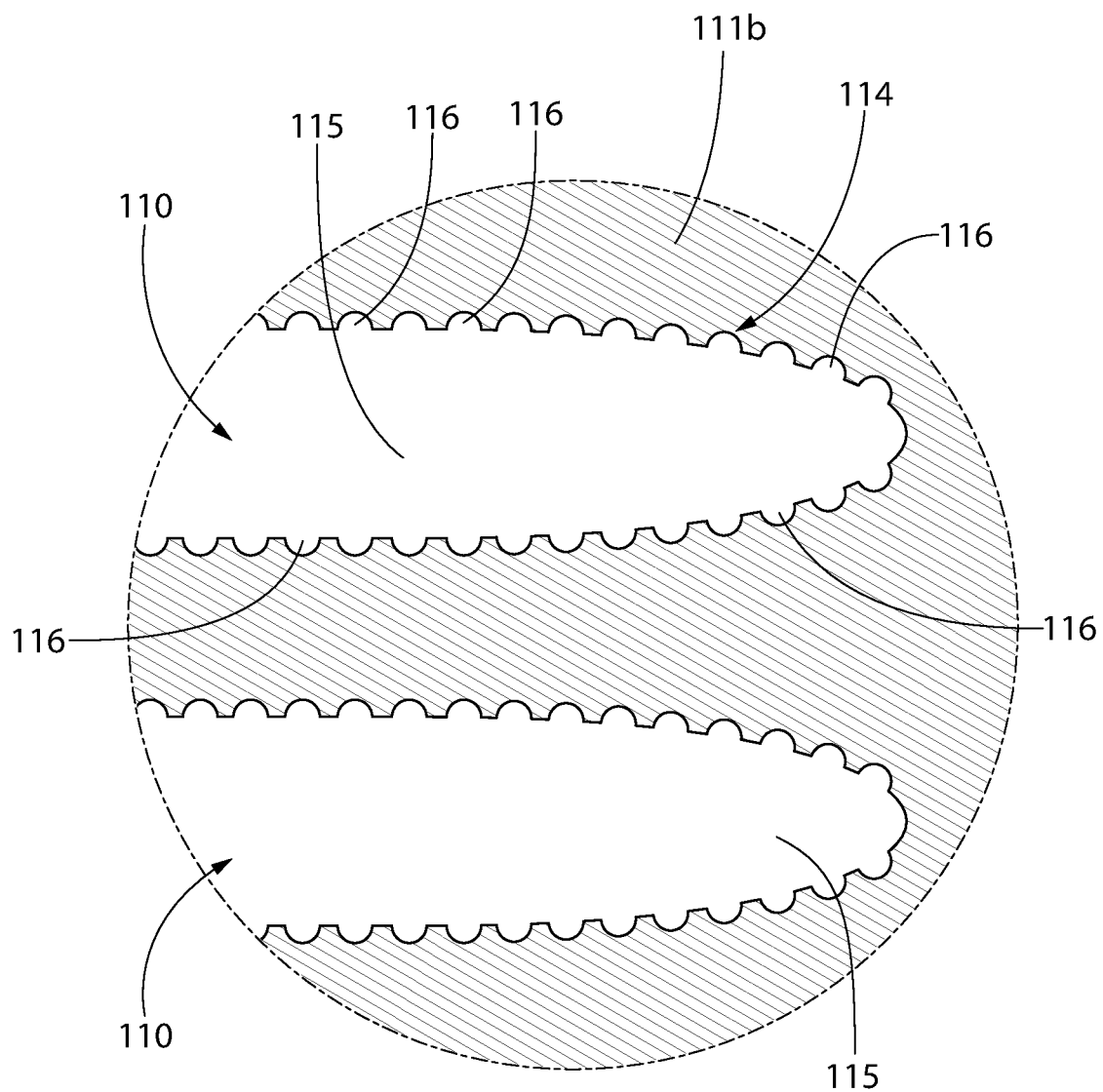
FIG. 4B is a close-up view of area IVB of FIG. 4.

Referring briefly to FIGS. 2A and 4B, the mold cavity 110 may include a first channel section 112, a second channel section 113, and a third channel section 114. Specifically, the first channel section 112 may correspond to a base portion 121 of the fully formed head plate 120. The second channel section 113 may comprise a plurality of elongated channels 115 each extending from the first channel section 112. Each of the elongated channels 115 of the second channel section 113 may correspond to the body portion 123 of one of the cleaning elements 122 of the fully formed head plate 120. The third channel section 114 comprises a plurality of micro-sized channels 116. In certain embodiments, a plurality of the micro-sized channels 116 may extend from each of the elongated channels 115. In other embodiments, one or more of the micro-sized channels 116 may extend from at least one of the elongated channels 115. Each of the micro-sized channels 116 may correspond to one of the plurality of micro-sized protuberances 124 of the cleaning elements 122. Thus, the micro-sized channels 116 may have length, cross-sectional area, and volume dimensions that are the same as that which has been described above for the protuberances 124 (a length between 0.004 and 0.020 inches, a maximum cross-sectional area between 0.001 and 0.012 inches$^2$, and a volume that is less than 0.005 cubic inches).

Thus, in order to form the protuberances 124, the first molten material 119 must be able to flow into the micro-sized channels 116 of the mold cavity 110. Because these micro-sized channels 116 are so small, this may not be possible using standard injection molding techniques. However, the use of ultrasonic molding as described herein may facilitate the necessary flow of the first molten material 116 into the micro-sized channels 116.

Referring to FIG. 2B, the system 100 is illustrated with the first solid material 109 passing from the hopper 101 into the holding cavity 107. In this embodiment, it is possible that the system 100 is configured to pass a predetermined amount of the first solid material 109 from the hopper 101 into the holding cavity 107, the predetermined amount being the amount/volume of material needed to exactly fully fill the first mold cavity 110. This reduces excess material from being melted as would occur when using conventional injection molding processes. The hopper 101 may have a valve or other structure that prevents the first solid material 109 from passing into the main conduit 102 until the valve or other structure is opened. Similarly, the holding cavity 107 may have a valve or other structure located between the holding cavity 107 and the sub conduit 103 that ensures that the first solid material 109 is held in the holding cavity 107 until a desired time, at which point the valve is opened to permit flow of the material from the holding cavity 107 into the mold cavity 110.

In this embodiment, the first solid material 109 remains in solid form (i.e., pellets or the like) as it passes all the way from the hopper 101 to the holding cavity 107. This is because in some embodiments the system 100 does not use heat and hot runners to melt the first solid material 109 as it flows along the main and/or sub conduits 102, 103. Rather, the first solid material 109 is left to flow into the holding cavity 107 in its solid state (i.e., as pellets) where it is then melted by ultrasonic energy as described below. However, in some other embodiments the invention may also use hot runners and the like to melt the solid material 109, and thus a combination of hot runner technologies and ultrasonic energy may be used. However, hot runner technologies are not as energy efficient as ultrasonic energy technologies so it may be desirable to only use ultrasonic energy for melting the material for cost-saving reasons.

Figure 2C:
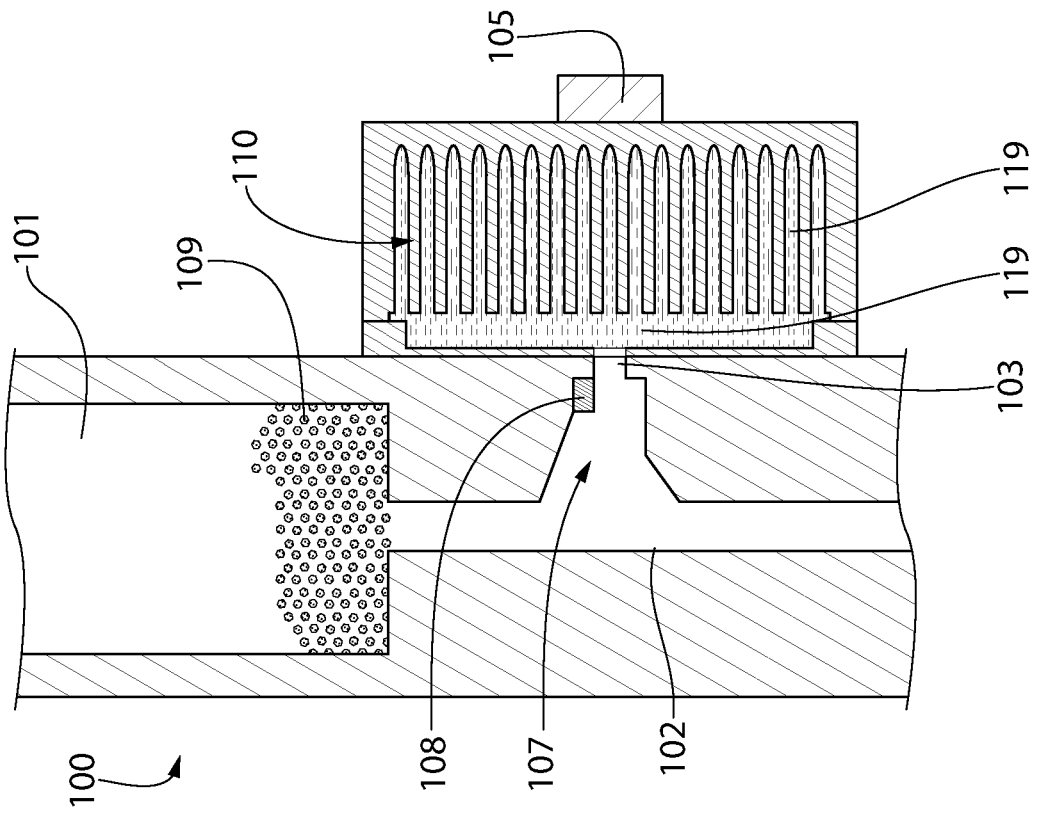
FIG. 2C is the close-up view of area IIA of FIG. 1 illustrating ultrasonic energy being applied to the solid material in the holding cavity to melt the solid material.

Referring to FIG. 2C, once a predetermined or desired amount of the first solid material 109 is located within the holding cavity 107, the first ultrasonic transducer 108 is activated to generate ultrasonic energy, illustrated as the curved segmented lines labeled 116. In this embodiment, the first ultrasonic transducer 108 is located within the holding cavity 107 so that upon activation of the first ultrasonic transducer 108, the ultrasonic energy is transmitted immediately to the first solid material 109 located within the holding cavity 107, thereby causing the first solid material 109 within the holding cavity 107 to melt and form a first molten material 119. The application of ultrasonic energy to the first solid material 109 will cause the first solid material 109 in the holding cavity 107 to immediately melt.

Figure 2D:
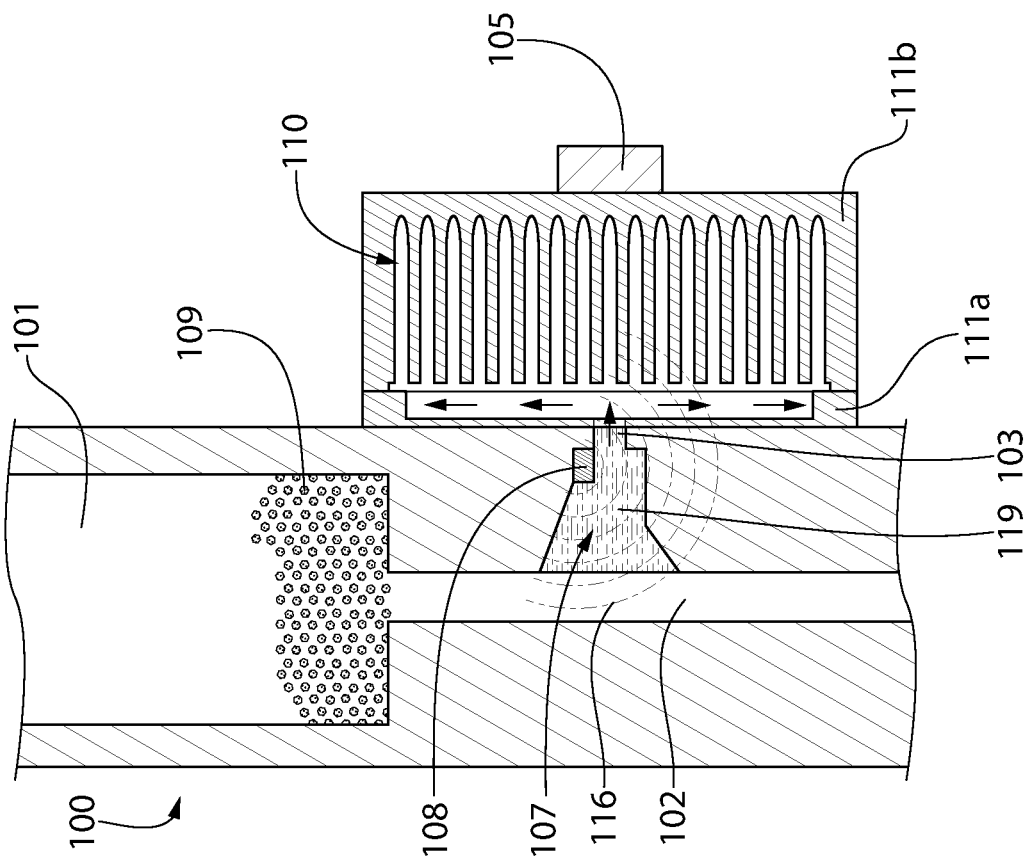
FIG. 2D is the close-up view of area IIA of FIG. 1 illustrating the melted material passing from the holding cavity into the mold cavity.

Referring now to FIG. 2D, once melted the first molten material 119 may be permitted to pass from the holding cavity 107 through the sub conduit 103 and into the first mold cavity 110. As noted above, this can be achieved by opening a valve at the junction between the holding cavity 107 and the sub conduit 103. Alternatively, a piston or other device may be moved into contact with the first molten material 119 to force the first molten material 119 into the first mold cavity 110, or the first molten material 119 may be pumped into the first mold cavity 110. Alternative techniques for flowing the first molten material 119 from the holding cavity 107 into the first mold cavity 110 would be understood by persons skilled in the art and fall within the scope of the disclosure set forth herein.

The first molten material 119 passes into and completely fills the first mold cavity 110 including spaces with small cross-sectional areas (i.e., the micro-sized channels 116) that are used to form micro features (i.e., the protuberances 124) as described herein. The micro-sized channels 116 may have similar dimensions to that which was described above for the protuberances 124 (i.e., a height between 0.004 and 0.020 inches and a cross-sectional area in a range of 0.001 and 0.012 inches$^2$). Specifically, the micro-sized channels formed into the mold will correlate in size and shape to the protuberances 124. The protuberances 124 may be as shown in FIG. 4A, or they may have other shapes, protruding directions, or the like within the confines of the disclosure set forth herein.

Figure 3:
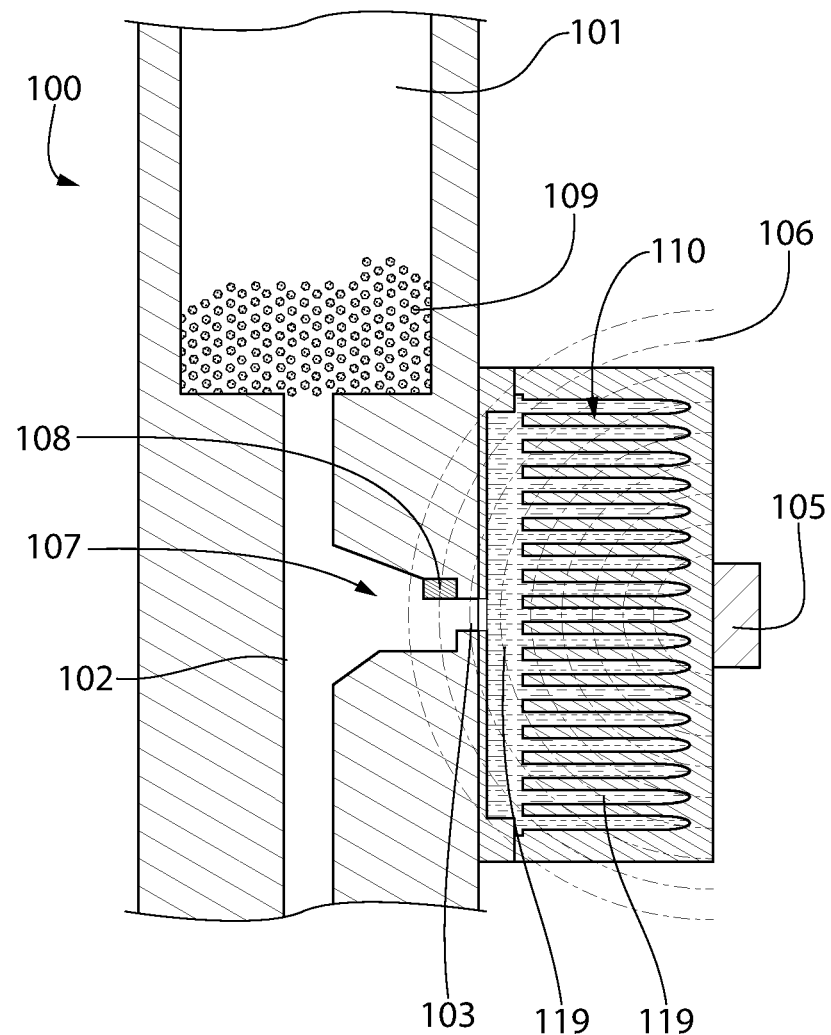
FIG. 3 is the close-up view of area IIA of FIG. 1 illustrating ultrasonic energy being applied to the melted material in the mold cavity.

Referring to FIG. 3, in certain embodiments the first mold cavity 110 may have some micro-sized channels with very small cross-sectional areas or very high aspect ratios that are difficult for the first molten material 119 to pass into. In such embodiments, once the first molten material 119 has passed into the first mold cavity 110, the second ultrasonic transducer 105 may be activated. Because the second ultrasonic transducer 105 is coupled to the mold halves 111a, 111b, the ultrasonic energy (labeled 106) generated by the ultrasonic transducer 105 will facilitate flow of the first molten material 119 into these micro-sized channels of the mold cavity 110.

In some embodiments, the first ultrasonic transducer 108 may be omitted. In such embodiments, the first solid material 109 may be melted using traditional injection molding processes such as hot runners, cold runners, nozzles, screw, and barrel. Thus, in one embodiment the invention is directed to the incorporation of the second ultrasonic transducer 105 that applies ultrasonic energy to the first molten material 119 that is in the mold cavity 110. Thus, even if ultrasonic energy is not used to initially melt the material, ultrasonic energy may be used to ensure that the melted material can flow into all of the channels, crevices, pockets, and the like of the mold cavity 110 no matter how small. In still other embodiments, the first solid material 109 may flow all the way into the mold cavity 110 without being melted at all. In such embodiments, the first solid material 109 will be melted into the first molten material 119 due to the ultrasonic energy generated by the second ultrasonic transducer 108 only after it is present in the mold cavity 110.

After the first molten material 119 has filled the first mold cavity 110 as desired, the first molten material 119 is allowed to cool and harden within the first mold cavity 110. This can be achieved by actively cooling the first mold cavity 110 (with an air flow generator, a fan, a cooling device, or the like) or via the passage of time that permits the first molten material 119 to solidify. Referring to FIG. 4, once solidified the first molten material 119 hardens in the shape of the first mold cavity 110, which is to say that it forms a head plate 120 for a toothbrush in the exemplified embodiment. As shown in FIG. 4, once the first molten material 119 has sufficiently hardened, the second mold half 111b is moved relative to the first mold half 111a to permit the head plate 120 to be removed from the mold cavity 110.

As described above, in the exemplified embodiment, the head plate 120 comprises the base portion 121 and the plurality of cleaning elements 122 extending from the base portion 121 in a spaced apart manner. Thus, the head plate 120 has cleaning elements 122 thereon and does not need to be separately tufted by coupling bristles thereto. The cleaning elements 122 may have round or polygonal transverse cross-sectional shapes, they may be end rounded, tapered, or the like, and they may have smooth or stepped outer surface. However, in other embodiments the head plate 120 may not be formed with any cleaning elements thereon, or the head plate 120 may have some cleaning elements formed integrally with the base portion 121 and yet may still require additional bristles to be coupled thereto using traditional techniques for coupling bristle tufts to toothbrush heads and head plates as discussed above (stapling of AFT, for example).

In the exemplified embodiment, the head plate 120 may include micro features (i.e., the protuberances 124 shown in FIG. 4A) that are easier to create using ultrasonic molding than with traditional injection molding as described herein. Specifically, the base portion 121 and/or the cleaning elements 122 may include features that are very small, have very small cross-sections, have very large aspect ratios, or the like (small, long, flat, thin, heavily detailed, etc.). This may be in the form of fins or other protrusions on the body portions 123 of the cleaning elements 122 that facilitate a more effective cleaning. Alternatively, it may be the cleaning elements 122 themselves that have a micro-size, or it may be fibers, fingers, or other protrusions extending from the base portion 121 of the head plate 120 rather than or in addition to extending from the cleaning elements 122. The invention is not to be limited by the size, shape, and location of such micro features on the head plate 120 in all embodiments. Furthermore, in still other embodiments the head plate 120 may not include any micro features and it may simply be formed using ultrasonic molding for efficiency, cost-savings, or other reasons.

The head plate 120 may be formed from (and thus the first solid material 109 and the first molten material 119 may be) resilient materials such as thermoplastic elastomer materials. In certain preferred embodiments, the head plate 120 may be formed from thermoplastic elastomers including styrenic block copolymers, thermoplastic olefins, elastomeric alloys, thermoplastic copolyester, thermoplastic polyamide, or thermoplastic polyurethane, silicone, or the like.

In the exemplified embodiment, once the head plate 120 is formed using ultrasonic molding as described herein above, it may be set aside until it is needed to form the finished toothbrush. At this point in time (if not done beforehand), the body portion of the toothbrush is formed. This is described below with reference to FIGS. 5-7.

Figure 5:
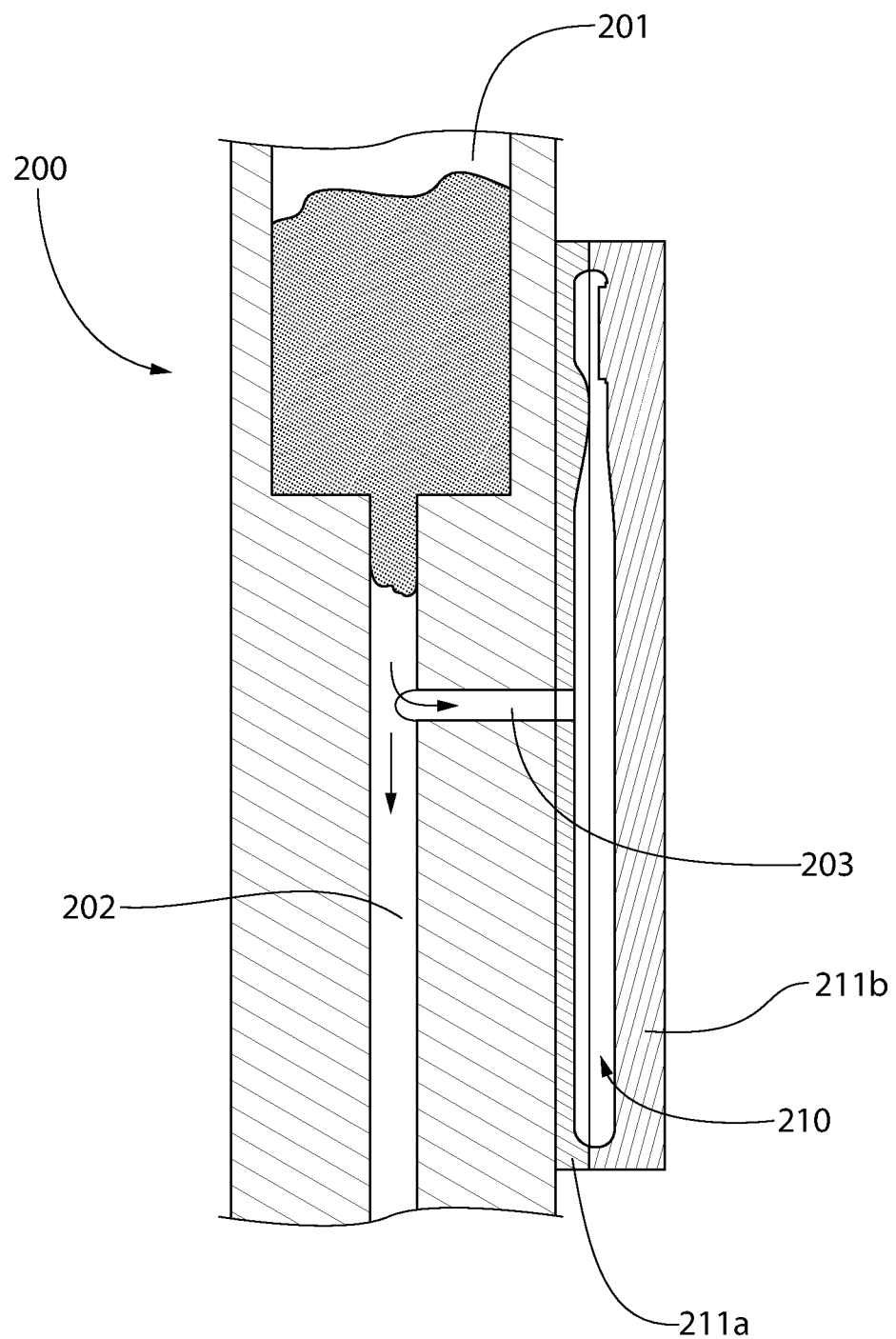
FIG. 5-7 are schematic views illustrating forming a body of an oral care implement in a mold cavity.

Referring to FIG. 5, a system 200 is illustrated for forming a body of a toothbrush. The system 200 includes a hopper 201, a main conduit 202, a sub conduit 203, and a second mold cavity 210. The second mold cavity 210 is defined by a first mold half 211a and a second mold half 211b that are movable relative to one another to gain access into the second mold cavity 210. In FIG. 5, a second material 209 is located within the hopper 201. The second material 209 may be in solid form (i.e., pellets) or liquid form within the hopper 201. However, in certain embodiments the second material 209 will be in solid form within the hopper 201 and it will melt into a liquid form as it flows along the main conduit 202 and the sub conduit 203, which are heated during use for this purpose. In the exemplified embodiment, the body of the toothbrush does not have any micro-sized components and thus it is formed using conventional injection molding techniques (hot runner or cold runner) without the use of a first ultrasonic transducer and ultrasonic energy. Alternatively, other manufacturing techniques can be used such as extrusion molding or the like. Of course, the body of the toothbrush may be formed using ultrasonic molding in some embodiments if desired for cost and energy-saving reasons. When using ultrasonic molding techniques, the body of the toothbrush may also include micro-sized features or protuberances in some embodiments if so desired for enhanced gripping or the like.

Figure 6:
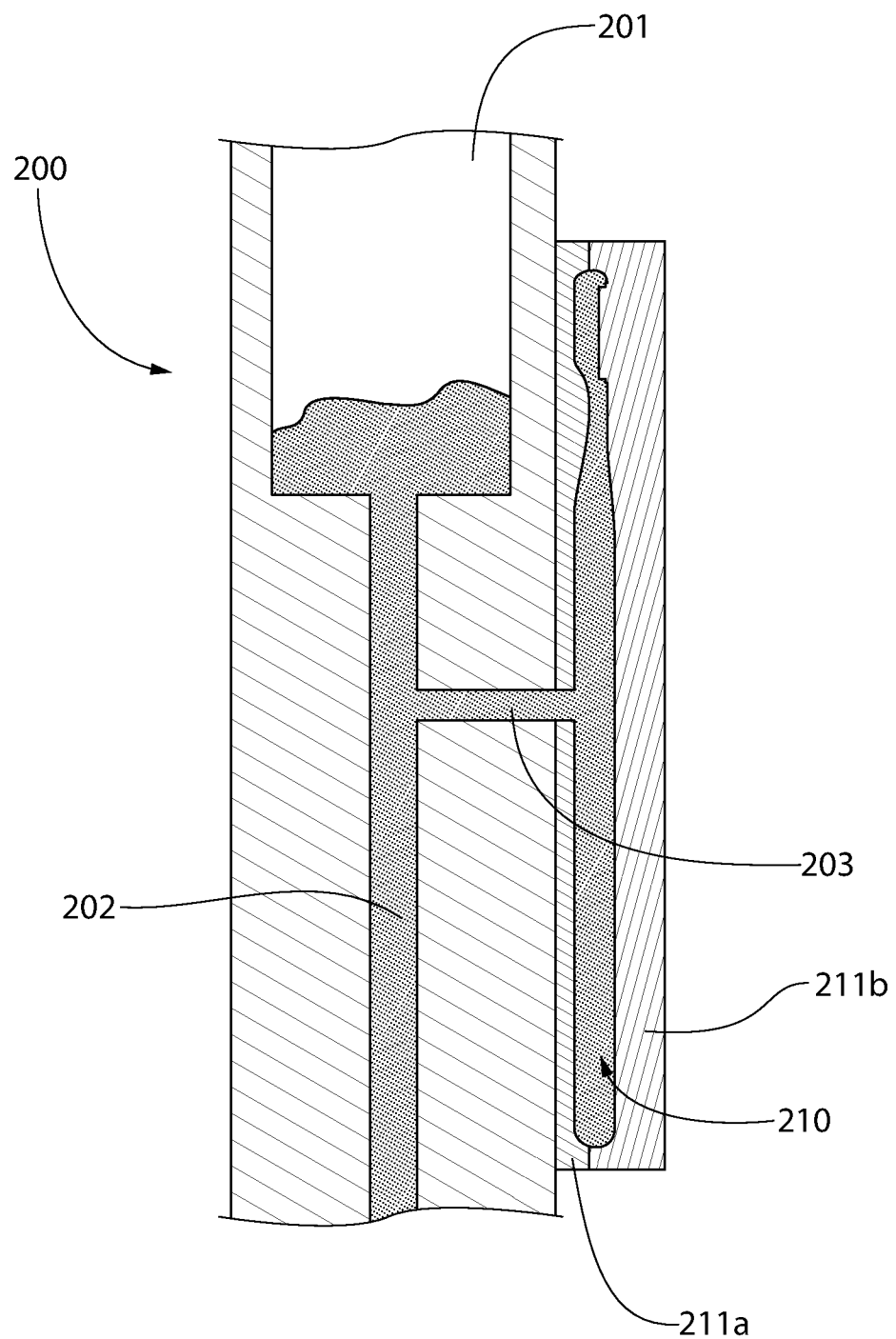

Referring to FIG. 6, the system 200 is illustrated with the second material 209 having passed through the main conduit 202 and the sub conduit 203 and into the second mold cavity 210. The second material 209 fills in the second mold cavity 210 so that an object (i.e., the body of a toothbrush) can be formed in the shape of the second mold cavity 210. Once the second material 209 fills the second mold cavity 210, it is allowed to cool and harden within the second mold cavity 210 to form the body 220 of the toothbrush.

Figure 7:
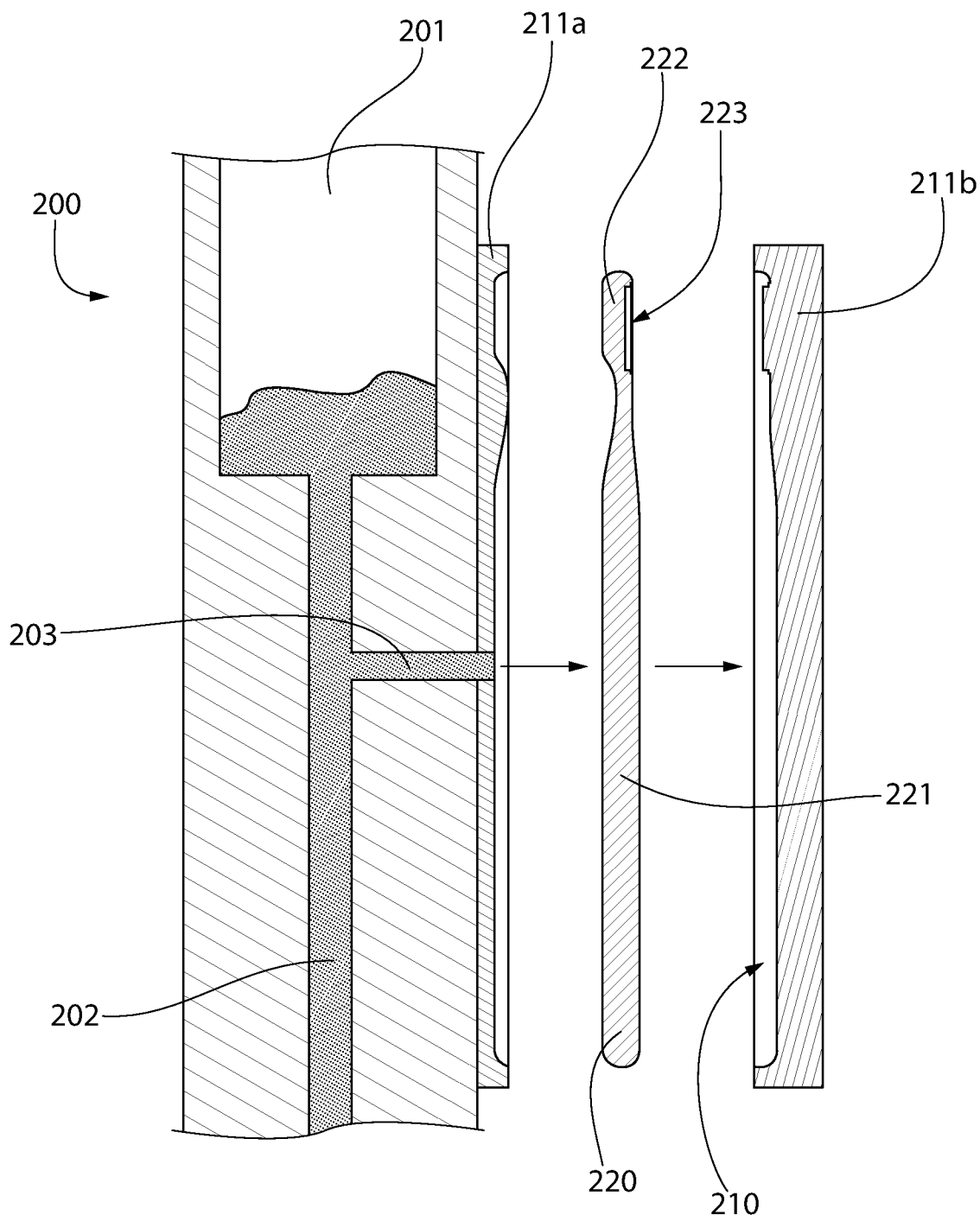

Next, referring to FIG. 7, the second mold half 211b is moved relative to the first mold half 211a so that the body 220 of the toothbrush may be removed from the second mold cavity 210. The body 220 has a handle portion 221 that is shaped and sized for comfortable gripping by a user and a head portion 222 that is inserted into a user's mouth during use. The head portion 222 has a basin 223 within which the head plate 120 may be inserted for coupling the head plate 120 to the head portion 222 of the body 220.

As noted above, the body 220 of the toothbrush is formed from a second material. The second material is preferably a hard or rigid plastic material, such as for example without limitation polymers and copolymers of ethylene, propylene, butadiene, vinyl compounds, and polyesters such as polyethylene terephthalate. The body 220 may be inserted into a third mold cavity so that a gripping material may be overmolded onto the handle portion 221 of the body 220 and/or so that a soft tissue cleaner may be overmolded onto a rear surface of the head portion 222 of the body 220. Such a gripping material and a soft tissue cleaner may be formed of a thermoplastic elastomer.

Figure 8:
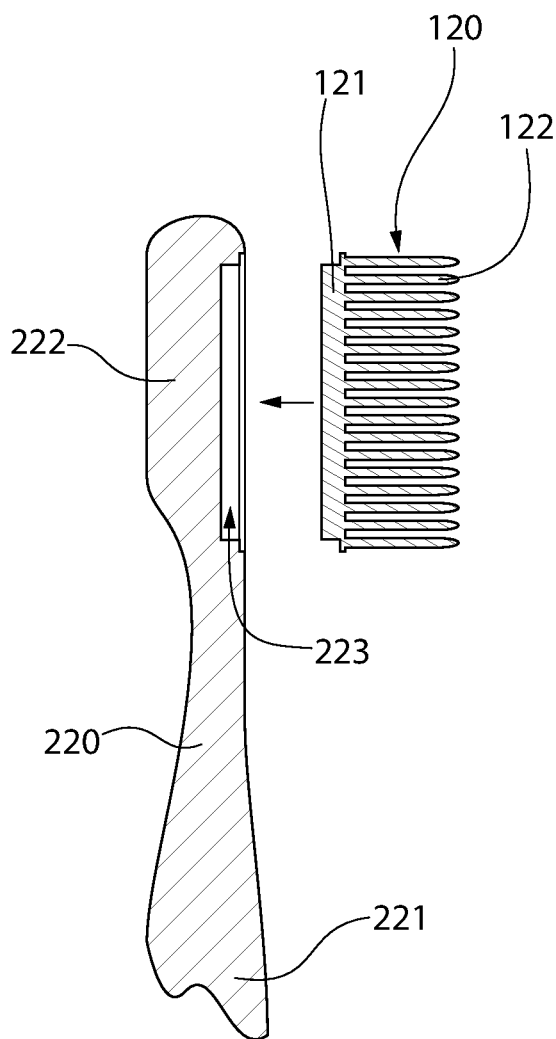
FIGS. 8 and 9 are schematic views illustrating coupling the head plate of FIG. 4 to the body of FIG. 7.
Figure 9:
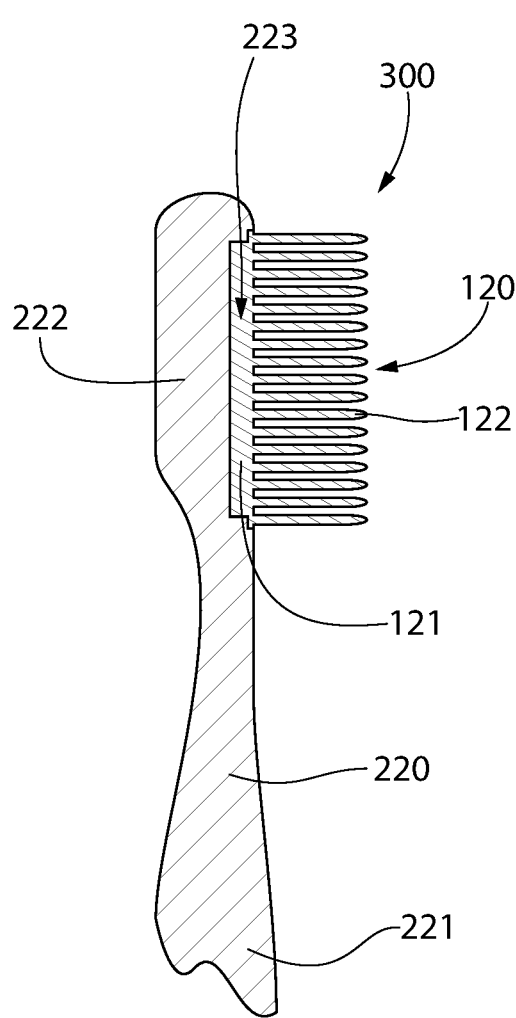

Referring to FIGS. 8 and 9, after the head plate 120 is formed as described above with reference to FIGS. 1-4 and after the body 220 is formed as described above with reference to FIGS. 5-7, the head plate 120 may be coupled to the body 220 to form the toothbrush 300. The base portion 121 of the head plate 120 is inserted into the basin 223 of the head portion 222 of the body 220. Then, the head plate 120 is ultrasonically welded to the body 220. Of course, ultrasonic welding is just one technique, and other techniques for coupling together separately formed head plate 120 and bodies 220 include other forms of welding, adhesion, mechanical interferences, tight fit, friction fit, lock and key, or the like. Once the head plate 120 is coupled to the body 220 as illustrated in FIG. 9, the toothbrush 300 is fully formed/manufactured and ready for use. Of course, additional manufacturing steps may be taken at this time to form a grip on the handle portion 221 of the body 220, to form a soft tissue cleaner on the rear surface of the head portion 222 of the body, to add bristles, or the like if so desired.

Figure 10:
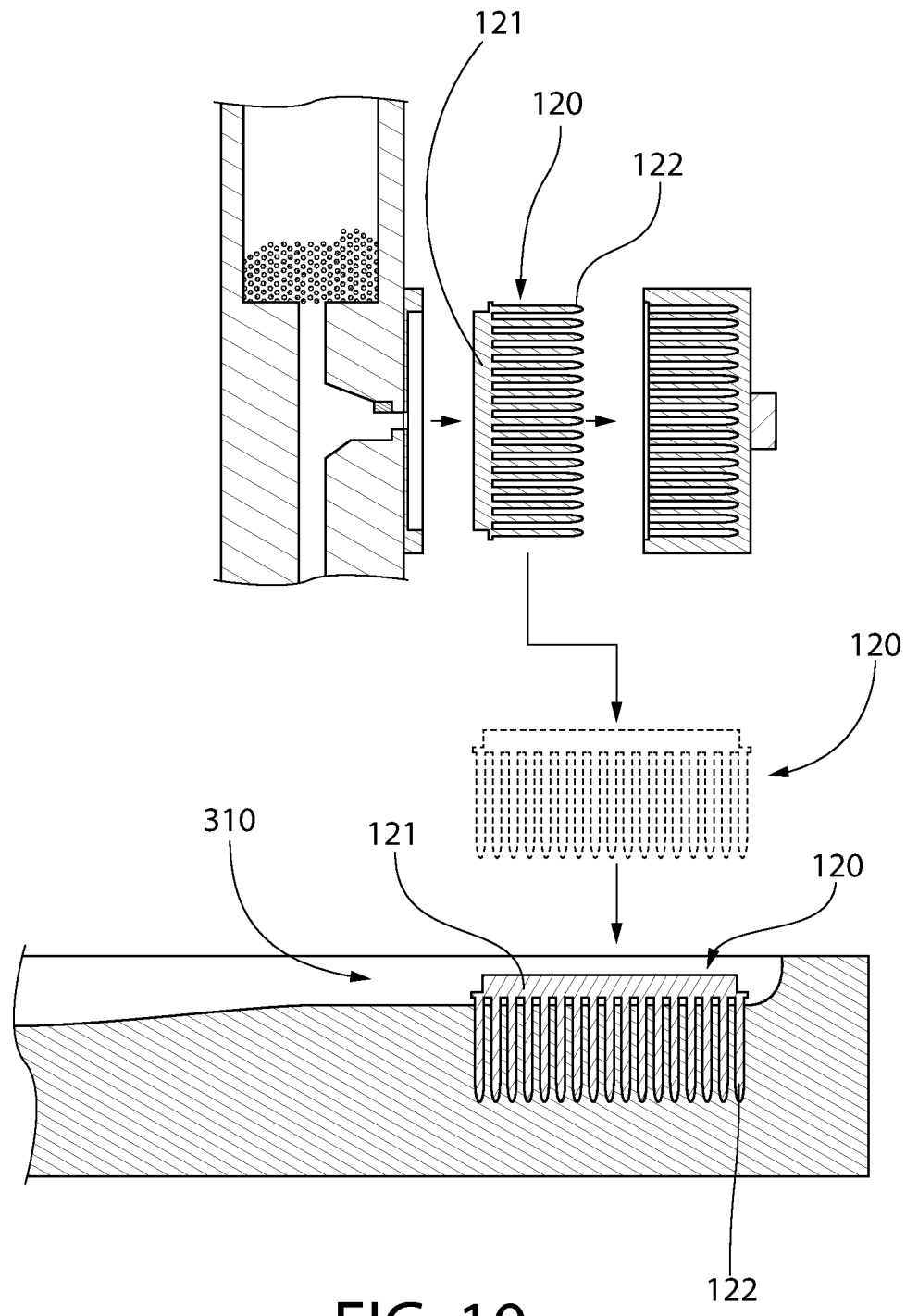
FIG. 10 is a schematic view illustrating inserting the head plate of FIG. 4 into a mold cavity.
Figure 11:
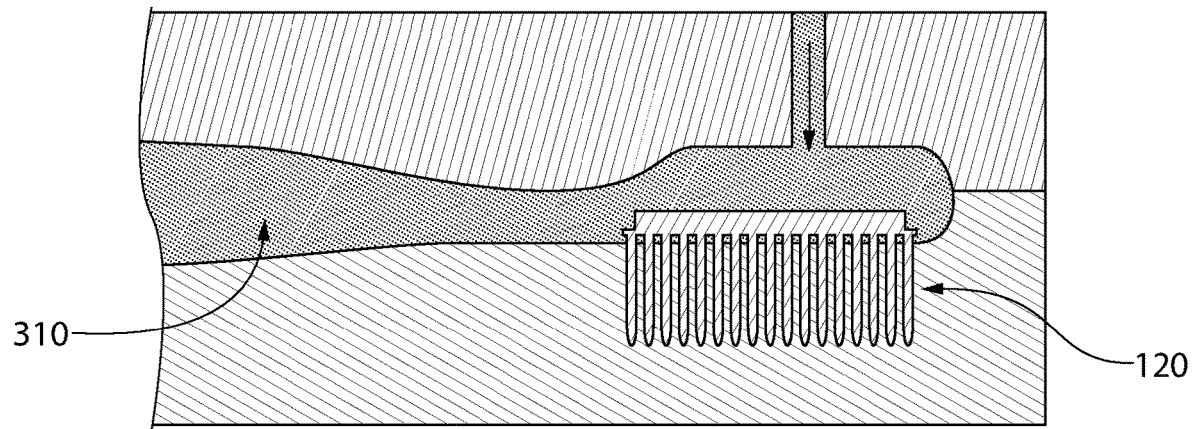
FIGS. 11 and 12 are schematic views illustrating forming the body around the head plate within the mold cavity of FIG. 10.
Figure 12:
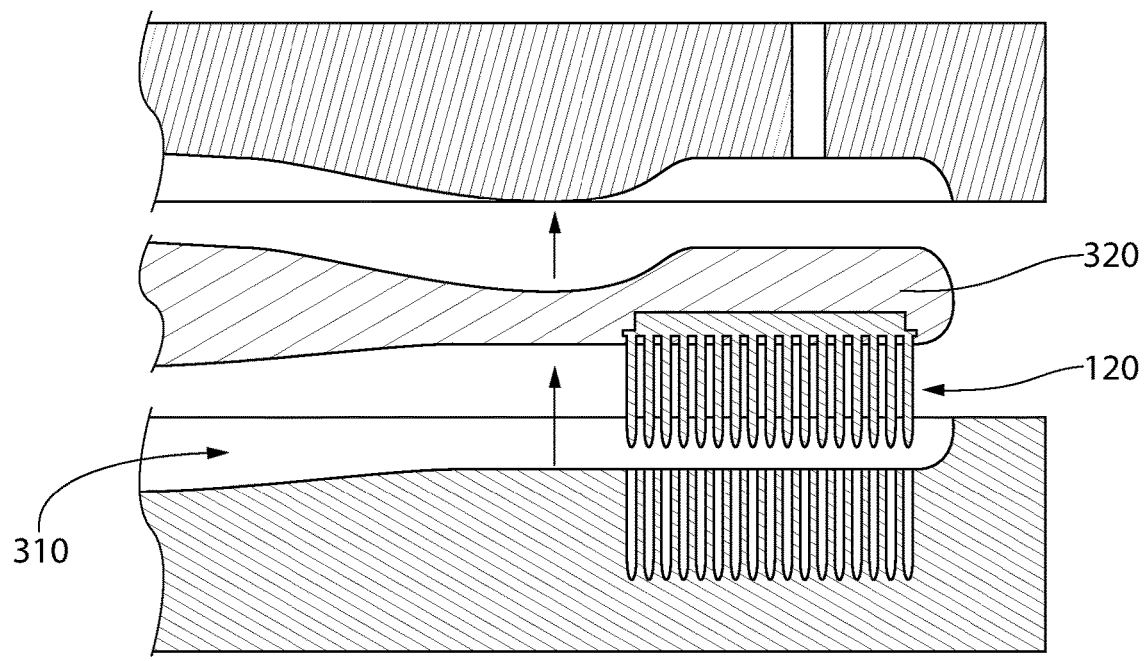

FIGS. 10-12 illustrate one alternative technique for coupling the head plate 120 to a body 320 of a toothbrush. In this embodiment, after the head plate 120 is formed using ultrasonic molding as described herein with specific reference to FIGS. 1-4, the head plate 120 is inserted into a mold cavity 310. This step is illustrated in FIG. 10. Next, a molten material is injected into the mold cavity 310 around the head plate 120. This step is illustrated in FIG. 11. Finally, the molten material in the mold cavity 310 is allowed to cool and harden to form the body 320. The molten material surrounds the head plate 120 so that as it hardens and forms the body 320 it automatically creates a structure whereby the head plate 120 is secured/coupled to the body 320. The head plate 120 and the body 320 may be collectively removed from the mold cavity 310 when it is opened as illustrated in FIG. 12. Thus, in this embodiment the head plate 120 is coupled to the body 320 as the body is formed 320 rather than in a separate step via welding or the like.

In some embodiments, the entire toothbrush or oral care implement including the handle, the head, and the cleaning elements may be made in a single mold cavity. Thus, in some embodiments there may not be a separate head plate, but rather the entire oral care implement may be formed as one monolithic structure using an ultrasonic molding technique as described herein. In such an embodiment, micro-sized features may be included on portions of the handle, the head, or the cleaning elements as described herein.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of forming an oral care implement comprising:
   flowing a first material into a first mold cavity;
   applying ultrasonic energy to the first material to facilitate flow of the first material into micro-sized channels of the first mold cavity;
   allowing the first material to harden within the first mold cavity to form a head plate comprising micro-sized features corresponding to the micro-sized channels of the first cavity;
   forming a body from a second material, the body including a handle portion and a head portion; and
   coupling the head plate to the head portion of the body.

2. The method according to claim 1 wherein the head portion of the body comprises a basin, and wherein coupling the head plate to the head portion of the body comprises inserting the head plate into the basin of the body and ultrasonically welding the head plate to the body.

3. The method according to claim 1 wherein forming the body and coupling the head plate to the head portion of the body take place simultaneously by inserting the head plate into a second mold cavity, injecting the second material, in molten form, into the second mold cavity so that the second material at least partially surrounds the head plate, and allowing the second material to cool and harden around the head plate in the second mold cavity.

4. The method according to claim 1 wherein the first material is a resilient material and the second material is a rigid material.

5. The method according to claim 4 wherein the first material is a thermoplastic elastomer and the second material is a hard plastic.

6. The method according to claim 1 wherein the micro-sized features have a cross-sectional area between 0.001 and 0.012 inches squared and a height between 0.004 and 0.020 inches.

7. The method according to claim 1 wherein the micro-sized features have a volume of between 0.000008 and 0.003 cubic inches.

8. The method according to claim 1 wherein the head plate is a monolithic structure comprising a base portion and cleaning elements extending from the base portion, and wherein the cleaning elements comprise the micro-sized features.

9. The method according to claim 1 wherein the head plate is a monolithic structure comprising a base portion and a plurality of cleaning elements extending from the base portion, each of the cleaning elements comprising a body portion having an outer surface and a plurality of protuberances extending from the outer surface of the body portion to a distal end, the protuberances being the micro-sized features such that each of the protuberances has a height measured from the outer surface of the body portion to the distal end of the protuberance that is between 0.004 and 0.020 inches.

10. The method according to claim 9 wherein each of the protuberances has a maximum cross-sectional area between 0.001 and 0.012 inches squared and a volume between 0.000008 and 0.003 cubic inches.

11. The method according to claim 1 further comprising attaching a plurality of tufts of bristles to the head plate.

12. A method of forming a monolithic head plate for an oral care implement, the head plate comprising a base portion and a plurality of cleaning elements extending from the base portion, the plurality of cleaning elements comprising a body portion and a plurality of micro-sized protuberances extending from the body portion, the method comprising:
    providing a first mold having a first mold cavity, the first mold cavity comprising a first channel section corresponding to the base portion of the head plate, a second channel section comprising a plurality of elongated channels corresponding to the body portions of the plurality of cleaning elements, and a third channel section comprising a plurality of micro-sized channels corresponding to the plurality of micro-sized protuberances of the plurality of cleaning elements, each of the micro-sized channels extending from one of the elongated channels of the second channel section;
    flowing a first material into the first mold cavity until each of the first, second, and third channel sections of the first mold cavity are filled with the first material;
    applying ultrasonic energy to the first material to facilitate flow of the first material into the micro-sized channels of the first mold cavity; and
    allowing the first material to harden within the first mold cavity to form the head plate.

13. The method according to claim 12 wherein each of the micro-sized channels has a length between 0.004 and 0.020 inches and a maximum cross-sectional area between 0.001 and 0.012 inches$^2$.

14. The method according to claim 12 wherein each of the micro-sized channels has a volume that is less than 0.005 cubic inches.

* * * * *